(12) United States Patent
Wei et al.

(10) Patent No.: US 8,233,258 B2
(45) Date of Patent: Jul. 31, 2012

(54) DC BUS CLAMP CIRCUIT TO PREVENT OVER VOLTAGE FAILURE OF ADJUSTABLE SPEED DRIVES

(75) Inventors: Lixiang Wei, Whitefish Bay, WI (US); Zhijun Liu, Menomonee Falls, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 845 days.

(21) Appl. No.: 12/354,109

(22) Filed: Jan. 15, 2009

(65) Prior Publication Data

US 2010/0177452 A1    Jul. 15, 2010

(51) Int. Cl.
*H02H 3/22* (2006.01)
(52) U.S. Cl. ....................................... 361/111
(58) Field of Classification Search ............... 361/111
See application file for complete search history.

(56) References Cited

U.S. PATENT DOCUMENTS

| | | | |
|---|---|---|---|
| 5,784,236 A * | 7/1998 | Tardiff et al. | 361/56 |
| 6,392,907 B1 * | 5/2002 | Ichikawa | 363/98 |
| 7,016,205 B2 * | 3/2006 | Steigerwald et al. | 363/40 |
| 7,541,791 B2 * | 6/2009 | Quazi | 323/282 |
| 2003/0107349 A1 * | 6/2003 | Haydock et al. | 322/28 |
| 2005/0041443 A1 * | 2/2005 | Franke et al. | 363/55 |
| 2006/0208687 A1 * | 9/2006 | Takeoka et al. | 318/801 |
| 2006/0226816 A1 * | 10/2006 | Wai et al. | 323/222 |
| 2007/0177407 A1 * | 8/2007 | Bruckmann et al. | 363/8 |
| 2008/0080212 A1 * | 4/2008 | Grbovic | 363/21.12 |
| 2008/0297248 A1 * | 12/2008 | Honda | 330/251 |
| 2009/0033236 A1 * | 2/2009 | Alexandrov | 315/224 |
| 2009/0079193 A1 * | 3/2009 | Nielsen et al. | 290/44 |
| 2010/0080028 A1 * | 4/2010 | Cheng et al. | 363/126 |
| 2010/0102770 A1 * | 4/2010 | Lee | 318/802 |
| 2011/0007530 A1 * | 1/2011 | Swamy et al. | 363/37 |

FOREIGN PATENT DOCUMENTS

JP        08023682 A  *  1/1996

* cited by examiner

*Primary Examiner* — Ronald W Leja
(74) *Attorney, Agent, or Firm* — Boyle Fredrickson, S.C.; Alexander R. Kuszewski; John M. Miller

(57) ABSTRACT

The present invention relates to a protective circuit to provide over voltage protection for an ASD. The protective circuit provides the benefits of fewer components with lower power ratings than existing protective circuits. The protective circuit may be incorporated directly in the ASD for continuous protection or mounted externally and connected to the ASD under operating conditions that require the circuit. This flexibility for mounting the protective circuit allows the capacitor of the protective circuit to be sized either in relation to capacitive elements on the DC bus within the ASD or according to external capacitance observed at the output of the ASD. In addition, the circuit is only operative during an overvoltage condition allowing for power ratings lower than would be required for continuous operation.

15 Claims, 4 Drawing Sheets

DC BUS CLAMP CIRCUIT TO PREVENT OVER VOLTAGE FAILURE OF ADJUSTABLE SPEED DRIVES

BACKGROUND OF THE INVENTION

The present invention relates generally to protective circuits for adjustable speed drives for AC electric motors, and in particular to a DC bus clamping circuit providing protection against component failure during an over voltage fault or adverse operating conditions.

Common AC motors use three-phase electrical power connected to the stator windings of a motor to run the motor. Each stator winding is connected to a different conductor from a three-phase power source, in which each conductor delivers a different phase of the electrical power to the motor. The three-phase power source may be a direct connection to line power, but more commonly, the motor is connected to an adjustable speed motor drive (ASD). The ASD allows for speed control of the motor not available by connecting the motor directly to line power.

As is known in the art, there are many electrical topologies for ASDs used to convert the fixed voltage and frequency from the line input into a controlled voltage and frequency output for a three-phase motor. One common topology includes a rectifier section which converts the line power into a DC voltage used to charge a DC bus section of the ASD. An inverter section then uses a switching algorithm, typically pulse width modulation (PWM), to convert the DC voltage from the DC bus into a variable voltage and frequency output to the motor. Controlling the variable voltage and frequency output to the motor controls the speed at which the motor rotates.

While an ASD provides the benefit of speed control for a motor, it can also introduce negative side effects. PWM algorithms utilize high frequency switching to alternate between short pulses of DC voltage from the DC Bus and no voltage being output to the motor. The duration of these pulses vary such that averaging the DC voltage of the pulse along with the periods during which no voltage is being output results in a lower fundamental AC voltage and frequency seen at the motor, providing a three phase AC waveform suitable for speed control of a motor. However, the high frequency voltage pulses also introduce high frequency electrical transients at the motor output. The motor is connected to the ASD by a power cable. The power cable may introduce a common mode capacitance to the system. In systems where a high capacitance may be present, such as with long power cables, multiple motors operating from a common DC bus, or a high horsepower motor, the high capacitance output creates an impedance that interacts with the high frequency voltage pulses to establish reflected voltage and current waveforms at the output. These reflected waveforms produce voltage and current surges that can create an over voltage condition for both the motor and the drive components. If the over voltage condition is generated in the motor windings, the life of the motor may be shortened. If the over voltage condition occurs at the drive, the voltage seen between the DC bus and ground may be much higher than normal, creating a voltage stress on the insulation of the drive components (e.g. switching mode power supply transformer, IGBT gate opto-coupler, DC link chokes, and common mode capacitors). This voltage stress may similarly result in a shortened life of the drive components.

The inventors have identified a second condition in which an overvoltage condition for the drive may be generated. If multiple motors are operating from a common DC bus, it is possible that a single motor may fail while the other motors continue operation. It is also possible that a single motor may be damaged yet continue to operate. For example, if one winding in a motor has a ground fault condition, it may draw substantial currents while that phase is switched on by the inverter and substantial voltage or current spikes can be generated. Because each of the multiple motors operates from a common DC bus, the other motors may similarly be affected by the voltage or current spikes. Further, the multiple inverter sections may allow for conductive paths not present in single inverter systems that allow for voltage or current surges that can create an over voltage condition. Therefore, if a single motor fails, or begins to fail, it may affect other motors or drives on the common DC bus and cause subsequent motor or drive failures.

Prior attempts to protect against over voltage conditions include detecting rising voltage levels on the DC bus and shutting off the inverter section in response to the over voltage condition. This approach may result in undesirable down time of a motor or even an entire process line on which the motor is installed.

Other attempts to protect against over voltage conditions have included snubber circuits at the motor terminals or across the DC bus. Such circuits have been designed to handle continuous operation and are, therefore, required to handle significant voltages and currents. This requirement results in high voltage and power ratings for the components or alternatively multiple components designed to share the load. The increased power ratings or number of components results in an increased cost of the circuit.

SUMMARY OF THE INVENTION

The present inventors have identified a protective circuit that may be used to provide over voltage protection for an ASD. The protective circuit provides the benefits of fewer components with lower power ratings than existing protective circuits. The protective circuit may be incorporated directly in the ASD for continuous protection or mounted externally and connected to the ASD under operating conditions that require the circuit. This flexibility for mounting the protective circuit allows the capacitor of the protective circuit to be sized either in relation to capacitive elements on the DC bus within the ASD or according to external capacitance observed at the output of the ASD. In addition, the circuit is only operative during an overvoltage condition, allowing for power ratings lower than would be required for continuous operation.

Specifically then, the present invention applies to a power supply having a DC bus providing a DC voltage across a positive and negative bus rail. The DC bus is connected to one or more inverters which provide power to windings of an electric motor. The DC bus has at least one capacitive element connected across the positive and negative bus rails. The present invention is an apparatus for reducing electrical transients on the DC bus including at least one damping element having a resistor and a damping capacitor connected in parallel with the resistor. A first and a second diode are each connected in series with a damping element between the common point and the positive and negative bus rails, respectively. The direction of conductance of the first diode is from the common point to the positive rail, and the direction of conductance of the second diode is from the negative rail to the common point.

Thus, it is one object of the invention to provide a damping circuit to reduce electrical transients across the capacitive elements of a DC bus. The diode connected in series with the damping element acts as a switch to engage the damping circuit only when it is needed, allowing for lower power ratings on the damping circuit components.

A first end of one of the damping elements may connect to the common point. A first diode is then connected in series between the second end of the damping element and the positive bus rail, and a second diode is connected in series between the negative bus rail and the second end of the damping element.

Consequently, a single damping element is connected in series with each of the diodes to complete the protective circuit. Thus, it is one object of the invention to provide a protective circuit with the fewest number of additional components.

Alternatively, a first damping element may connect in series with a first diode between the common point and the positive bus rail, and a second damping element may connect in series with a second diode between the negative bus rail and the common point.

Consequently, each of the first and the second damping elements will typically have a portion of the over voltage conditions occur across the damping element. The duration of time for which either one of the damping elements is conducting is reduced in comparison to using a single damping element. Thus, it is another object of the invention to provide a protective circuit with the lowest power ratings for the additional components.

The apparatus may be contained within the adjustable speed drive. Thus it is one object of the invention to provide inherent protection against certain fault and adverse operating conditions.

Alternatively, the apparatus may further include a frame supporting each damping element and diode and a connector allowing the apparatus to be externally connected to the positive bus rail, the negative bus rail, and the common point of an adjustable speed drive.

Thus it is one object of the invention to provide a separate module that may be added to an adjustable speed drive as needed.

Multiple adjustable speed drives may be configured to operate from a common DC bus and the apparatus may be externally connected to the common DC bus.

Thus it is another object of the invention to provide a single protection circuit to protect multiple inverters configured to operate from a common DC bus.

These and other features, advantages, and features of the invention will become apparent to those skilled in the art from the detailed description and the accompanying drawings.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
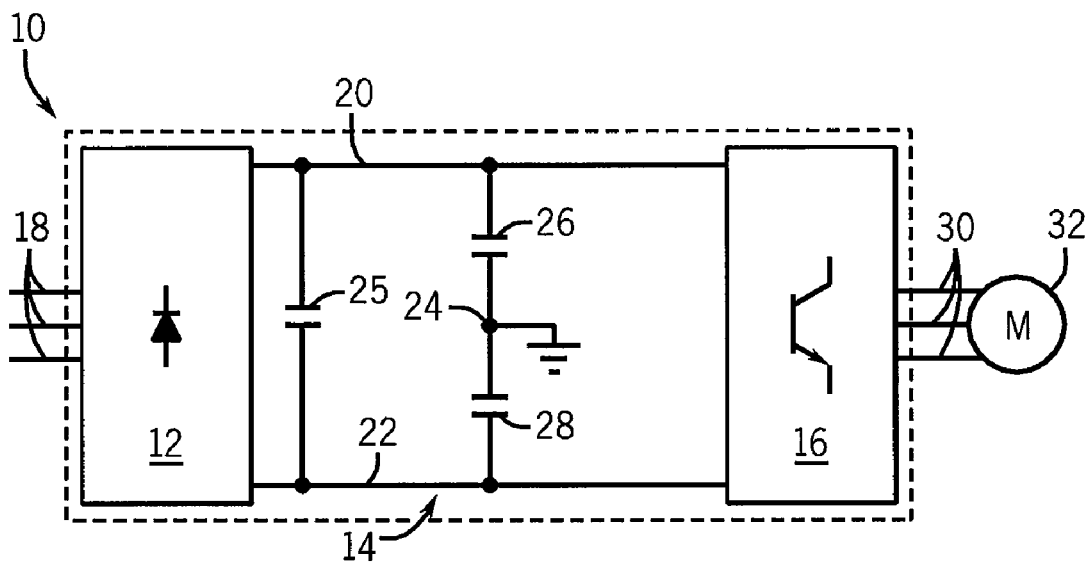
FIG. 1 is a schematic representation of a standard ASD illustrating a rectifier, a DC bus, and an inverter section.

Referring to FIG. 1, a common topology for an Adjustable Speed Drive 10 is illustrated. The ASD 10 includes a rectifier section 12, a DC bus section 14, and an inverter section 16. The ASD 10 receives three-phase AC input voltage 18 into the rectifier section 12. The rectifier section 12 may include passive or active rectification, for example diodes, thyristors, silicon controlled rectifiers, or transistors as is known in the art, to convert the three-phase AC input voltages into DC voltages. These DC voltages are present on the positive and negative DC bus rails 20 and 22 of the DC bus section 14. Typical DC voltages may be a positive or negative 650 volts for a common 460 volt, three-phase AC input voltage. To maintain a stiff DC voltage on each of the positive and negative bus rails, 20 and 22, a DC bus capacitor 25 is included between the rails 20 and 22, wherein a stiff DC voltage remains approximately equal to the peak value of the AC input voltage 18 despite transient voltages and currents present on the DC bus, for example when there is a change in the load on the output of the ASD 10.

At least one DC bus capacitor 25 is included between the positive rail 20 and the negative rail 22. Two common mode capacitors may also be included in series between the positive rail 20 and the negative rail 22 to reduce the common mode effects generated by the inverter switching. The common mode capacitors 26 and 28 typically have a low capacitance, for example about 0.1 microfarads, to keep ground currents low and to reduce costs. The first common mode capacitor 26 is connected between the positive rail 20 and a common point 24, the common point preferably being a ground point and, in particular, the same ground point at which most of the control circuitry is connected. The second common mode capacitor 28 is similarly connected between the negative rail 22 and the common point 24, or ground. The DC bus capacitor 25 and each common mode capacitor, 26 and 28, may alternately consist of one or more capacitors connected in series, parallel, or any combination thereof, as is known in the art.

Figure 2:
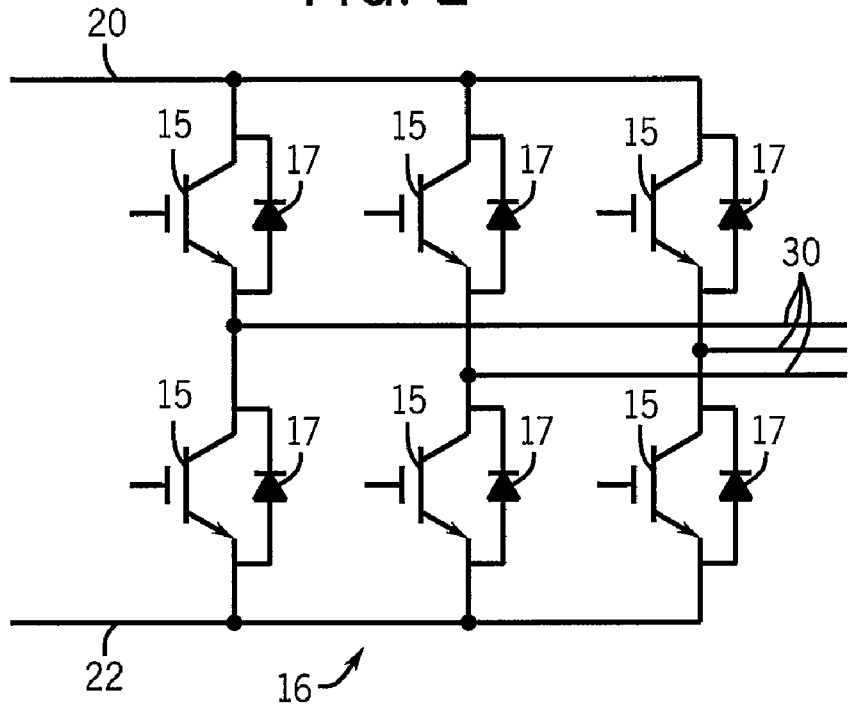
FIG. 2 is a schematic representation of one embodiment of an inverter section for use in the ASD of FIG. 1.
Figure 3:
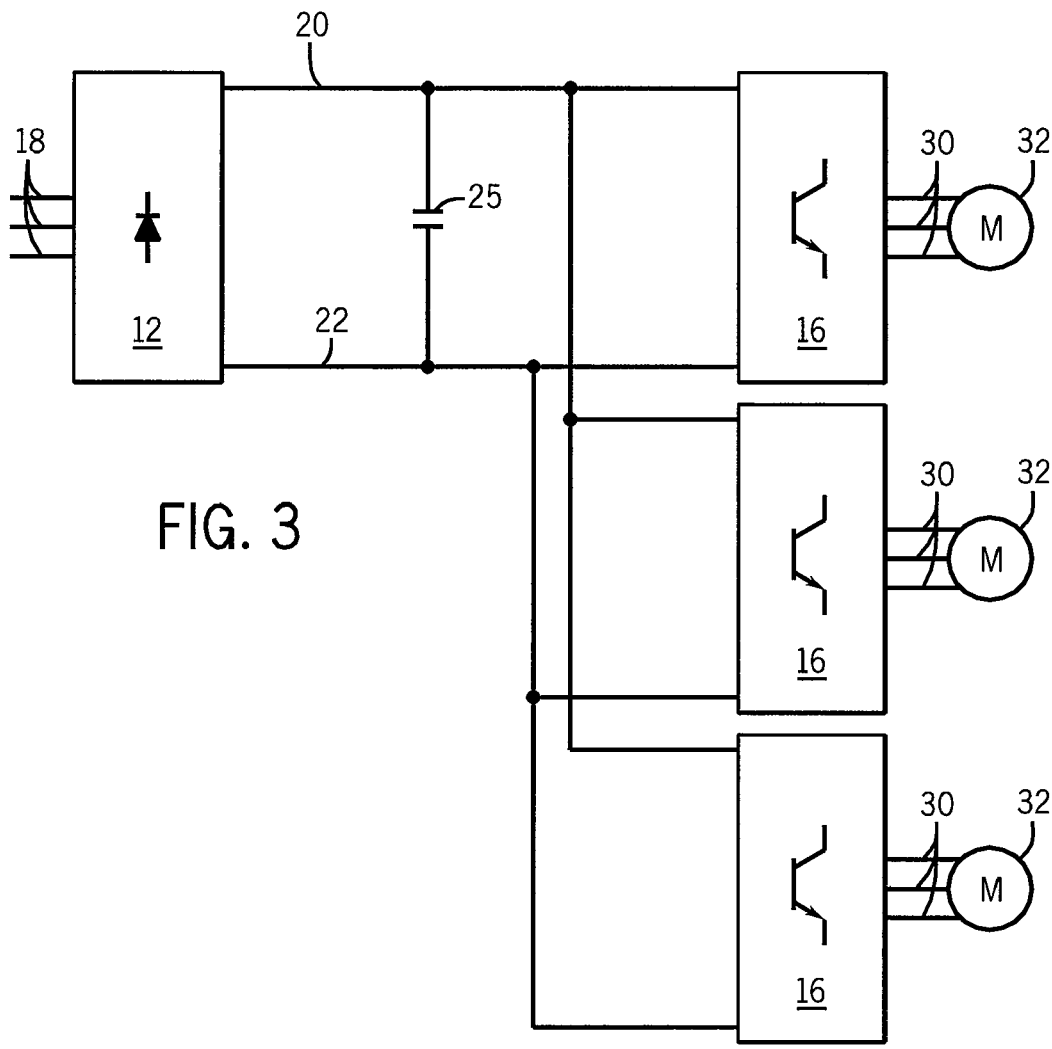
FIG. 3 is a schematic representation of multiple inverter sections connected to a single rectifier and DC bus section.

The DC bus section 14 is then connected to the inverter section 16. The inverter section 16 consists of switching elements, such as transistors or thyristors as is known in the art. FIG. 2 illustrates an exemplary embodiment of an inverter section wherein a transistor 15 and a diode 17 are connected in pairs between the positive rail 20 and each phase of the output voltage 30 as well as between the negative rail 20 and each phase of the output voltage 30. The inverter section 16 converts the DC voltages from the positive and negative rails 20 and 22 into a controlled three phase output voltage 30 to the motor 32. Alternatively, multiple inverter sections 16 may be connected to a single DC bus section 14 as shown in FIG. 3.

Figure 4:
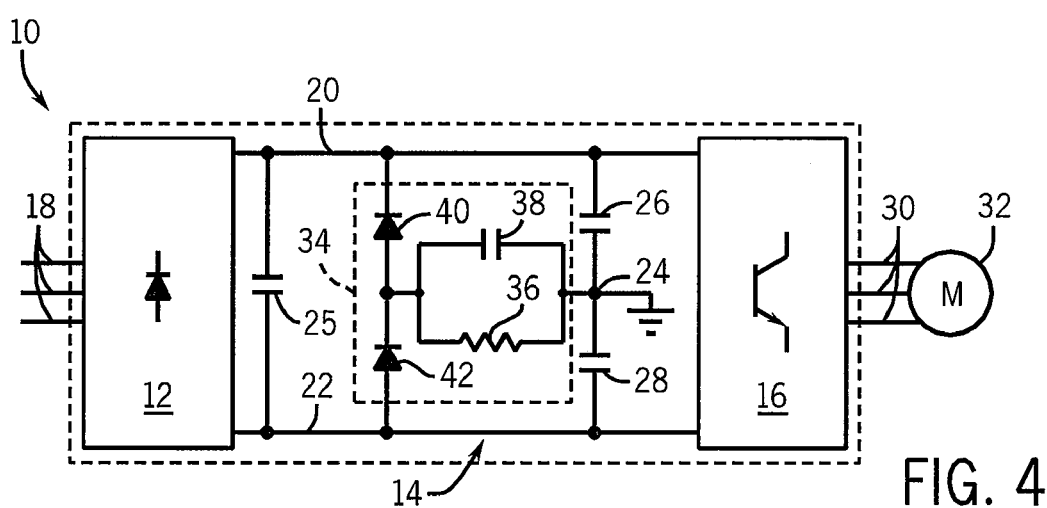
FIG. 4 is a schematic representation of a first embodiment of the present invention, shown in a standard ASD including common mode capacitors.

Referring next to FIG. 4, a first embodiment of the protective circuit 34 is illustrated. The protective circuit 34 includes a damping element, consisting of a resistor 36 and a damping capacitor 38 connected in parallel with each other. The protective circuit 34 further includes a first diode 40 connected in series with the damping element between the common point 24 and the positive DC bus rail 20. A diode conducts from the anode to the cathode, and the first diode 40 is oriented such that the direction of conductance is from the common point 24 to the positive rail 20. The protective circuit 34 also includes a second diode 42 connected in series with the damping element between the negative rail 22 and the common point 24. The second diode 42 is oriented such that the direction of conductance is from the negative rail 22 to the common point 24. Generally, the resistor 36 and capacitor 38 may be implemented through multiple series or parallel-connected resistors and capacitors as is known in the art. While FIG. 4 illustrates the protective circuit connected across a DC bus section 14 that includes the common mode capacitors, 26 and 28, the circuit may similarly be applied to a DC bus section 14 that does not include common mode capacitors, as shown in FIG. 5.

Figure 6:
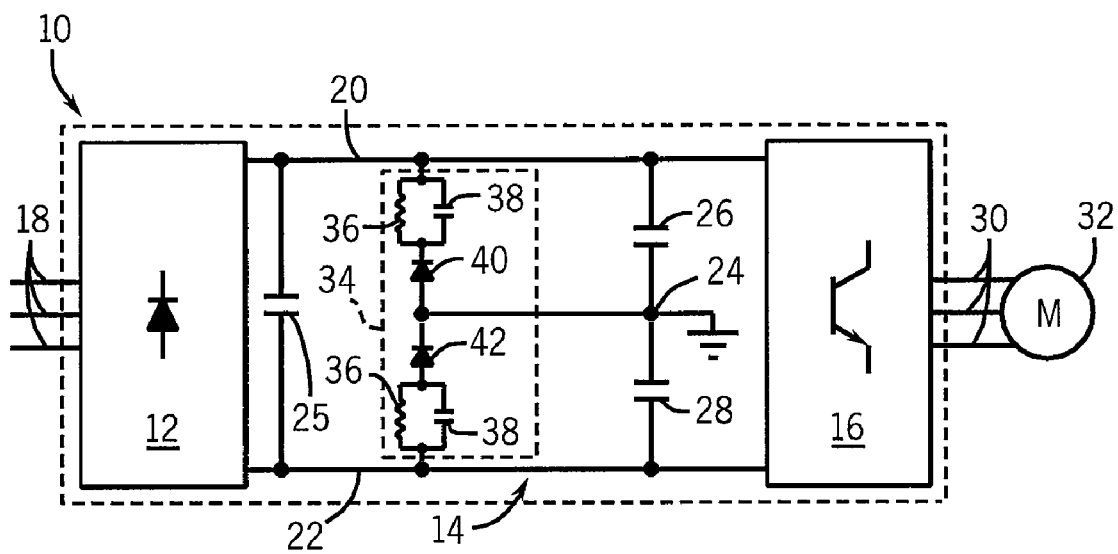
FIG. 6 is a schematic representation of a second embodiment of the present invention, shown in a standard ASD.

Referring next to FIG. 6, a second embodiment of the protective circuit 34 is illustrated providing an alternative topology for but an equivalent circuit with the first embodiment. The protective circuit 34 includes two damping elements, each consisting of a resistor 36 and a damping capacitor 38 connected in parallel with the resistor 36. A first diode 40 is connected in series with the first damping element between the common point 24 and the positive rail 20. The first diode 40 is oriented such that the direction of conductance is from the common point 24 to the positive rail 20. A second diode 42 is connected in series with the second damping element between the negative rail 22 and the common point 24. The second diode 42 is oriented such that the direction of conductance is from the negative rail 22 to the common point 24.

Figure 5:
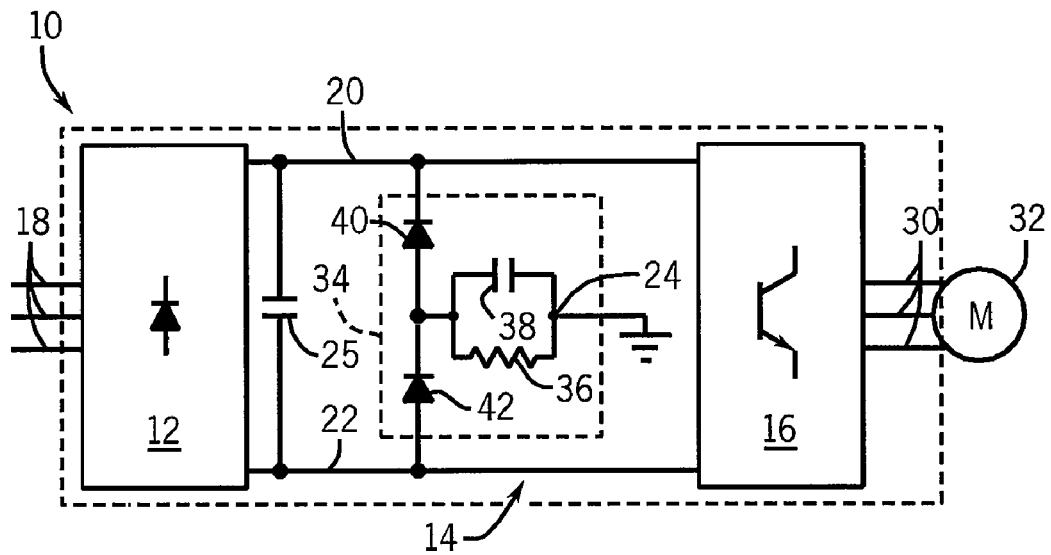
FIG. 5 is a schematic representation of a first embodiment of the present invention, shown in a standard ASD without common mode capacitors.
Figure 7:
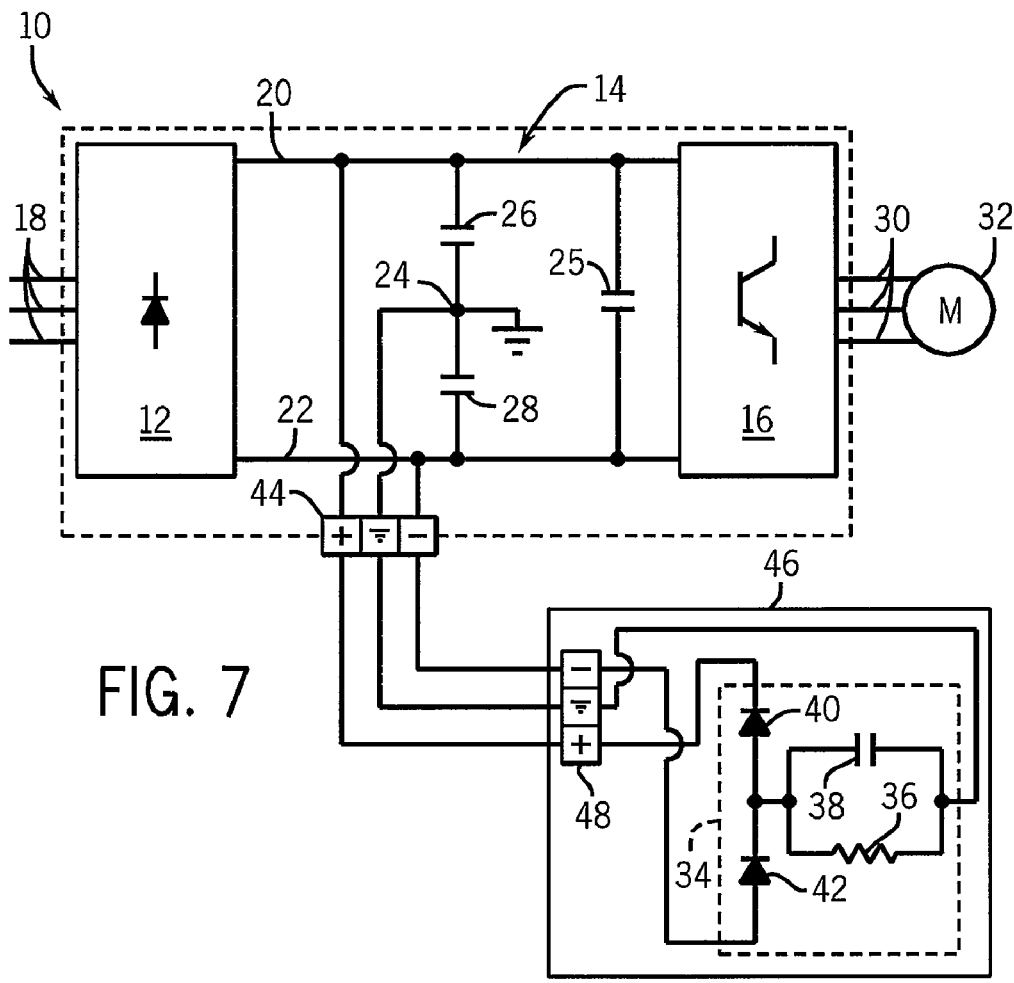
FIG. 7 is a schematic representation of a standard ASD with an embodiment of the present invention mounted externally to the ASD
Figure 8:
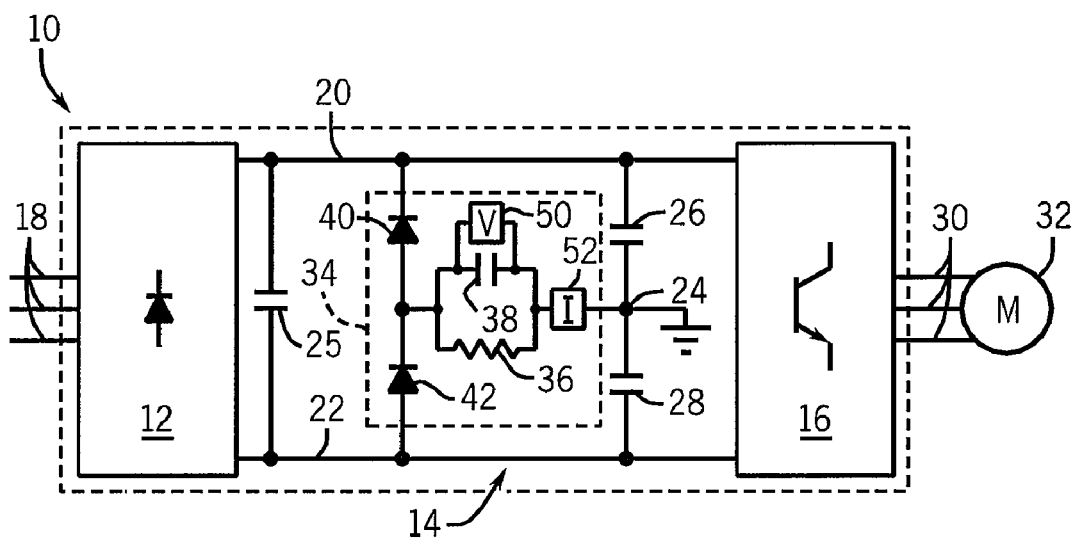
FIG. 8 is a schematic representation of a third embodiment of the present invention, shown in a standard ASD.

As illustrated in FIGS. 4-6, the protective circuit 34 may be mounted internal to the ASD 10. Such a configuration provides protection for each drive and is especially suited for applications in which a separate DC bus section 14 is used for each ASD 10 and motor 32 combination. It is also contemplated that the protective circuit 34 be mounted external to the ASD 10, as shown in FIG. 7. It is common for an ASD 10 to have a terminal block 44 including connections for each of the positive rail 20, negative rail 22, and common point 24 in a DC bus section 14. The components of the protective circuit 34 can be mounted on any suitable frame 46, as would be known in the art, along with a connector 48, by which the protective circuit 34 may be connected to the ASD 10 as previously described. The connector 48 is preferably a terminal block of any suitable type as known in the art; however, the connector 48 may also be lead wires to tie the protective circuit 34 directly to the ASD 10 or any other means known in the art to connect the protective circuit 34 to the ASD 10. Such a configuration is especially suited for applications in which multiple inverter sections 16 and motors 32 are operating from a common DC bus section 14, allowing a single protective circuit 34 to protect multiple inverters 16 and motors 32.

In operation, the protective circuit 34 reduces peak transient values of voltage during over voltage conditions. During normal operating conditions, the common point 24 is at a voltage level between the positive and negative DC bus rails 20 and 22 and is preferably electrically grounded. Under these conditions, both the first diode 40 and the second diode 42 are reverse biased and neither conducts. The protective circuit 34 is, therefore, not active under normal operating conditions. During an overvoltage condition, a transient voltage exists in the ASD such that the voltage potential at the common point 24 is either greater than the voltage potential on the positive DC bus rail 20 or less than the voltage potential on the negative DC bus rail 22. If the voltage potential at the common point 24 is greater than the voltage potential on the positive rail 20, the first diode 40 becomes forward biased and begins to conduct. Similarly, if the voltage potential at the common point 24 is less than the voltage potential on the negative rail 20, the second diode 42 becomes forward biased and begins to conduct.

In order for the protective circuit 34 to effectively reduce the peak transient values of voltage during the over voltage condition, the value of the damping capacitor 38 should be greater than the common mode capacitor, 26 or 28, across which it is connected. Preferably, the value of the damping capacitor 38 is about ten times greater than the value of the common mode capacitor 26 or 28. For example, a typical ASD may have a common mode capacitor of about 0.1 microfarad. The damping capacitor 38 should then have a value of at least 1 microfarad, and preferably a value between about 1 and 5 microfarads.

As mentioned above, the ASD 10 may be used on a system having high capacitance, such as with long power cables, multiple motors operating from a common DC bus, or a high horsepower motor. Under these conditions, it may be advantageous to use a protective circuit 34 mounted externally to the ASD 10. The value of the damping capacitor 38 may further be selected in response to the capacitance of the system rather than the value of the common mode capacitor 26 or 28 in the drive. The value of the system capacitance, for example the common mode capacitance of long leads extending between an ASD 10 and a motor 32, may be determined and the value of the damping capacitor 38 selected such that it is greater than, and preferably at least twice the value of, the system capacitance.

While the damping element is conducting, the damping capacitor 38 begins storing energy. When the transient voltage has returned to a value between the voltages present on the positive rail 20 and the negative rail 22 such that the damping element is no longer conducting, the stored energy in the damping capacitor 38 is discharged through the resistor 36. It is, therefore, desirable that the time constant of the damping element, determined by the values of the capacitor 38 and the resistor 36, be small enough that the damping capacitor 38 can discharge across the resistor 36 prior to the next over voltage condition. Because many of the transients are a result of the electrical switching within the inverter section 16, a time constant equal to or less than period of the electrical switching would be desirable. For example, if the ASD 10 is switching at 10 kHZ, the resultant period is 0.1 msec. Therefore, with a 1 microfarad damping capacitor 38, a 100 ohm resistor 36 is preferred.

One advantage of the protective circuit 34 disclosed herein is that the circuit 34 only conducts while an overvoltage condition exists and not under normal operating conditions where the ground voltage is between the voltages present at the positive rail 20 and the negative rail 22. As a result, the power ratings of the resistor 36, damping capacitor 38, and diodes 40 and 42 may be selected based on intermittent operation rather than continuous operation. The resulting power ratings for the components in the protective circuit may be less than 100 watts, and preferably less than 50 watts.

It is further contemplated that the protective circuit 34 may be used to detect ground faults or severe cable or motor operating conditions. A ground fault occurs when the insulation in one of the windings in the motor 32 fails and the winding shorts to the common, typically the chassis, of the motor 32. Under such a condition, the inverter section 16 may continue to switch the DC bus voltages across the winding creating significant voltage transients to the common on the motor. Typically the common on the motor 32 is electrically connected to the common point 24 on the ASD 10, usually over the ground wire in the motor cable. As a result, the voltage transients seen at the common point on the motor are also present at the common point 24 on the ASD 10. These transients cause the protective circuit 34 to conduct. Therefore, a voltage sensor 50 detecting the voltage potential across the damping element or a current sensor 52 measuring the current flowing through the damping element may be used to generate a signal subsequently processed by the ASD 10 to determine whether a ground fault condition exists.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. In a power supply having a DC bus providing a DC voltage across a positive and negative bus rail to one or more inverters which provide power to windings of one or more electric motors, the DC bus having at least one capacitive element connected across the positive and negative bus rails, an apparatus for reducing electrical transients on the DC bus comprising:
    at least one damping element having a resistor and a damping capacitor connected in parallel with the resistor; and
    a first and a second diode each connected in series with the at least one damping element between the common point and the positive and negative bus rails respectively, such that the direction of conductance of the first diode is from the common point to the positive rail and the direction of conductance of the second diode is from the negative rail to the common point.

2. The apparatus of claim 1 wherein:
    a first end of one of the damping elements is connected to the common point;
    the first diode is connected in series between a second end of the damping element and the positive bus rail; and
    the second diode is connected in series between the negative bus rail and the second end of the damping element.

3. The apparatus of claim 1 wherein:
    a first damping element is connected in series with the first diode between the common point and the positive bus rail; and
    a second damping element is connected in series with the second diode between the negative bus rail and the common point.

4. The apparatus of claim 2 wherein the damping element and the first and second diodes are contained within the power supply.

5. The apparatus of claim 2 further comprising:
    a frame supporting the at least one damping element, the first diode and the second diode; and
    a connector removably connecting the apparatus to the positive bus rail, the negative bus rail, and the common point of the power supply.

6. The apparatus of claim 5 wherein a common DC bus provides the DC voltage to a plurality of inverters, each inverter providing power to windings of one of the electric motors and the apparatus is connected to the common DC bus.

7. The apparatus of claim 2 wherein the resistor is about 100 ohms.

8. The apparatus of claim 2 wherein the damping capacitor is between about 1 microfarads and about 5 microfarads.

9. The apparatus of claim 2 further including a pair of common mode capacitors connected in series across the positive and negative bus rails wherein the damping capacitor has a capacitance at least ten times greater than the value of the common mode capacitors.

10. The apparatus of claim 2 wherein a long cable is connected between the inverter and the motor and the damping capacitor has a value selected to be at least two times a common mode capacitance value of the long cable.

11. The apparatus of claim 2 wherein the resistor and the capacitor have power ratings less than about 100 watts.

12. The apparatus of claim 2 further comprising a sensor to detect a ground fault condition in the motor connected to the power supply.

13. The apparatus of claim 12 wherein the sensor is one of a voltage sensor measuring the voltage across the damping element and a current sensor measuring current through the damping element.

14. A method of reducing electrical transients on a DC bus for an adjustable speed drive, the DC bus having a positive rail, a negative rail, and at least one capacitive element connected between the positive and negative rails, comprising the steps of:
    providing at least one protective circuit including a resistor and a capacitor connected in parallel with the resistor;
    connecting a first diode in series with the at least one protective circuit between a common point and the positive rail; and
    connecting a second diode in series with the at least one protective circuit between a common point and the negative rail.

15. The method of claim 14 further comprising the steps of:
    determining a value of common mode capacitance created due to a long motor cable extending between the adjustable speed drive and a motor;
    selecting a value for the capacitor greater than the value of common mode capacitance; and
    connecting the protective circuit to the DC bus at a terminal block on the adjustable speed drive.

* * * * *